(12) United States Patent
Navarro et al.

(10) Patent No.: US 11,312,323 B2
(45) Date of Patent: Apr. 26, 2022

(54) FRONT GRILLE LIGHT ASSEMBLY FOR EMERGENCY VEHICLES

(71) Applicant: Pro-gard Products, LLC, Noblesville, IN (US)

(72) Inventors: Mike Navarro, Noblesville, IN (US); Andrew Gunselman, Indianapolis, IN (US); Matt Jones, Noblesville, IN (US)

(73) Assignee: Pro-Gard Products LLC, Indianapolis, IN (US)

( * ) Notice: Subject to any disclaimer, the term of this patent is extended or adjusted under 35 U.S.C. 154(b) by 196 days.

(21) Appl. No.: 16/872,755

(22) Filed: May 12, 2020

(65) Prior Publication Data
US 2021/0354644 A1    Nov. 18, 2021

(51) Int. Cl.
    *B60R 19/52* (2006.01)
    *B60R 19/18* (2006.01)
    *F21S 41/19* (2018.01)
    *F21W 104/00* (2018.01)

(52) U.S. Cl.
    CPC ............ *B60R 19/52* (2013.01); *B60R 19/18* (2013.01); *F21S 41/19* (2018.01); *B60R 2019/1886* (2013.01); *B60R 2019/525* (2013.01); *F21W 2104/00* (2018.01)

(58) Field of Classification Search
    CPC ... B60R 19/52; B60R 19/18; B60R 2019/525; B60R 2019/1886; F21W 2104/00; F21S 41/19
    See application file for complete search history.

(56) References Cited

U.S. PATENT DOCUMENTS

| | | | |
|---|---|---|---|
| 6,238,070 B1 | 5/2001 | Galliner et al. | |
| 6,986,597 B2 | 1/2006 | Elwell | |
| 7,163,321 B2 | 1/2007 | Contarino | |
| 7,204,626 B2 | 4/2007 | Elwell | |
| 9,840,218 B1 * | 12/2017 | Wymore | B60R 19/50 |
| 10,427,587 B2 * | 10/2019 | Wymore | F21S 4/28 |
| 10,442,366 B2 | 10/2019 | VanEpps | |
| 10,576,877 B2 | 3/2020 | Moore et al. | |
| 10,821,884 B1 * | 11/2020 | Johnson | B60Q 1/28 |

OTHER PUBLICATIONS

Rockland Custom Products, Illumi-Grille brochure, https://secureservercdn.net/198.71.233.129/zbi.3c3.myftpupload.com/wp-content/uploads/2019/10/Illumi-Grille-2sided-flyer.pdf, available at least as early as Mar. 18, 2020.
Setina LED Push Bumber PB-4500-L Grill Guard for Police Cars SUVs Trucks and Vans https://www.fleetsafety.com/setina-led-push-bumper-pb-450-l-grill-guard-for-police-cars-suvs-trucks-and-vans/, available since at least as early as Mar. 23, 2020.

* cited by examiner

*Primary Examiner* — D Glenn Dayoan
*Assistant Examiner* — Melissa Ann Bonifazi
(74) *Attorney, Agent, or Firm* — Faegre Drinker Biddle & Reath LLP

(57) ABSTRACT

The present disclosure provides a lighting assembly configured to mount to the front-end of a vehicle without removal of an existing vehicle grille or fascia. The lighting assembly of the present disclosure further provides for lighting on the side-facing edge of the front-end of the vehicle to provide for improved visibility resulting in safer operation of the lighted vehicle.

36 Claims, 8 Drawing Sheets

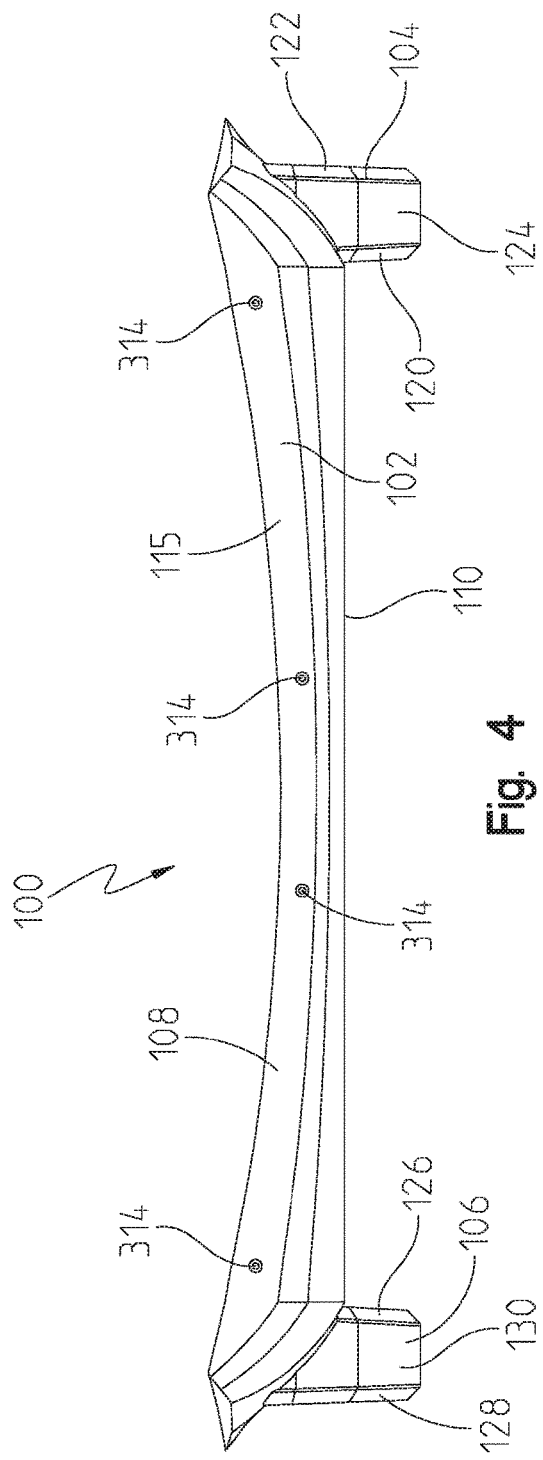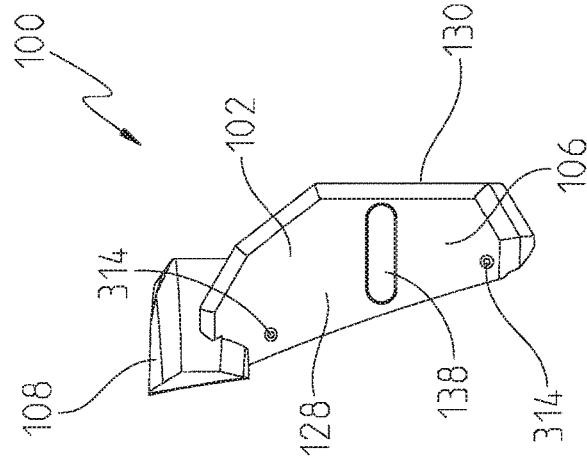

FRONT GRILLE LIGHT ASSEMBLY FOR EMERGENCY VEHICLES

TECHNICAL FIELD OF THE PRESENT DISCLOSURE

The present disclosure generally relates to a lighting assembly for vehicles. Specifically, the present disclosure relates to an apparatus and method for mounting a lighting assembly to an emergency vehicle to increase visibility and safety of the operator and approaching vehicles.

BACKGROUND OF THE DISCLOSURE

Utility and emergency vehicles are often outfitted with lighting assemblies, including aftermarket lighting assemblies, to increase visibility to other drivers and, at times, used to communicate while moving through traffic. Often, these lighting assemblies are installed on the front end of the vehicle, but installation is burdensome and requires removal of the existing fascia or vehicle grille. Furthermore, conventional front-end lighting assemblies are typically only visible from the front of the vehicle and may be hindered by a guard or other front-end tactical vehicle protection, which requires an emergency vehicle, for example, to drive further into an active intersection and risk a collision. Less invasive, more visible options are desired.

SUMMARY OF THE DISCLOSURE

The present disclosure provides a lighting assembly configured to mount to the front-end of a vehicle without removal of an existing fascia or vehicle grille. The lighting assembly of the present disclosure further provides for lighting on the side-facing edge of the front-end of the vehicle to provide for improved visibility resulting in safer operation of the lighted vehicle and approaching vehicles.

According to an illustrative embodiment of the present disclosure, a lighting and installation assembly is provided for coupling to a front fascia of a vehicle. The assembly includes a frame, illustratively a housing, defining a first light cut-out and a plurality of frame apertures. A plurality of frame fasteners are coupled to an interior face of the frame, each of the frame fasteners including a stud. A lighting unit corresponds to each light cut-out. A main light holder defines a plurality of holder apertures, the holder apertures each configured to selectively receive the stud of one of the plurality of frame fasteners. A first bracket includes a plurality of flanges defining a plurality of flange apertures, the plurality of flange apertures corresponding with the plurality of frame apertures, and defining a plurality of bracket apertures, each of the bracket apertures configured to receive an installation fastener.

According to a further illustrative embodiment of the present disclosure, a lighting assembly includes a frame, illustratively a housing, coupled to a front grille of a vehicle, the frame including a latitudinal portion defining at least one front light support, a first side profile portion defining a first side light support, and a second side profile portion defining a second side light support, the frame further defining a plurality of frame apertures. Each of a plurality of front lighting units correspond to one of the plurality of front light supports, the front lighting units configured to emit light in a direction forward facing from the vehicle. A first side lighting unit corresponds to the first side light support, and a second lighting unit corresponds to the second side light support. The first side lighting unit and the second side lighting unit are each configured to emit light in a direction away from a corresponding side of the vehicle and substantially perpendicular to the plurality of front lighting units.

According to another illustrative embodiment of the present disclosure, a method of installing a lighting assembly includes coupling a lighting unit to a light holder, coupling the light holder to a frame, illustratively a housing, of the lighting assembly, providing a bracket defining a plurality of installation apertures, and aligning the plurality of installation apertures with a plurality of fascia apertures in a fascia of a vehicle. The method further includes disposing a fastener through the plurality installation apertures and the corresponding fascia apertures, and coupling the bracket to the frame of the lighting assembly.

According to a further illustrative embodiment of the present disclosure, a method of installing a lighting assembly includes positioning a lighting unit within a light cut-out defined by a frame, illustratively a housing, of the lighting assembly, receiving a stud of a fastener through a corresponding holder aperture of a plurality of holder apertures defined by a light holder, the fastener coupled to an interior surface of the frame, and disposing a nut on the stud to secure the light holder to frame. The method further includes aligning a flange aperture defined by a flange of a bracket with a frame aperture defined by the frame, disposing a fastener through both the flange aperture and the frame aperture to secure the bracket to the frame, aligning an installation aperture defined by the bracket with a fascia aperture of a fascia of a vehicle, positioning a well nut within the fascia aperture, and inserting a fastener within the installation aperture and the well nut to secure the bracket to the fascia.

Additional features and advantages of the present disclosure will become apparent to those skilled in the art upon consideration of the following detailed description of the illustrative embodiments exemplifying the disclosure as presently perceived.

BRIEF DESCRIPTION OF THE DRAWINGS

The detailed description of the drawings particularly refers to the accompanying figures in which:

FIG. 4 is a top view of the lighting assembly of FIG. 3;

FIG. 6 is a side view of the lighting assembly of FIG. 3;

Figure 1:
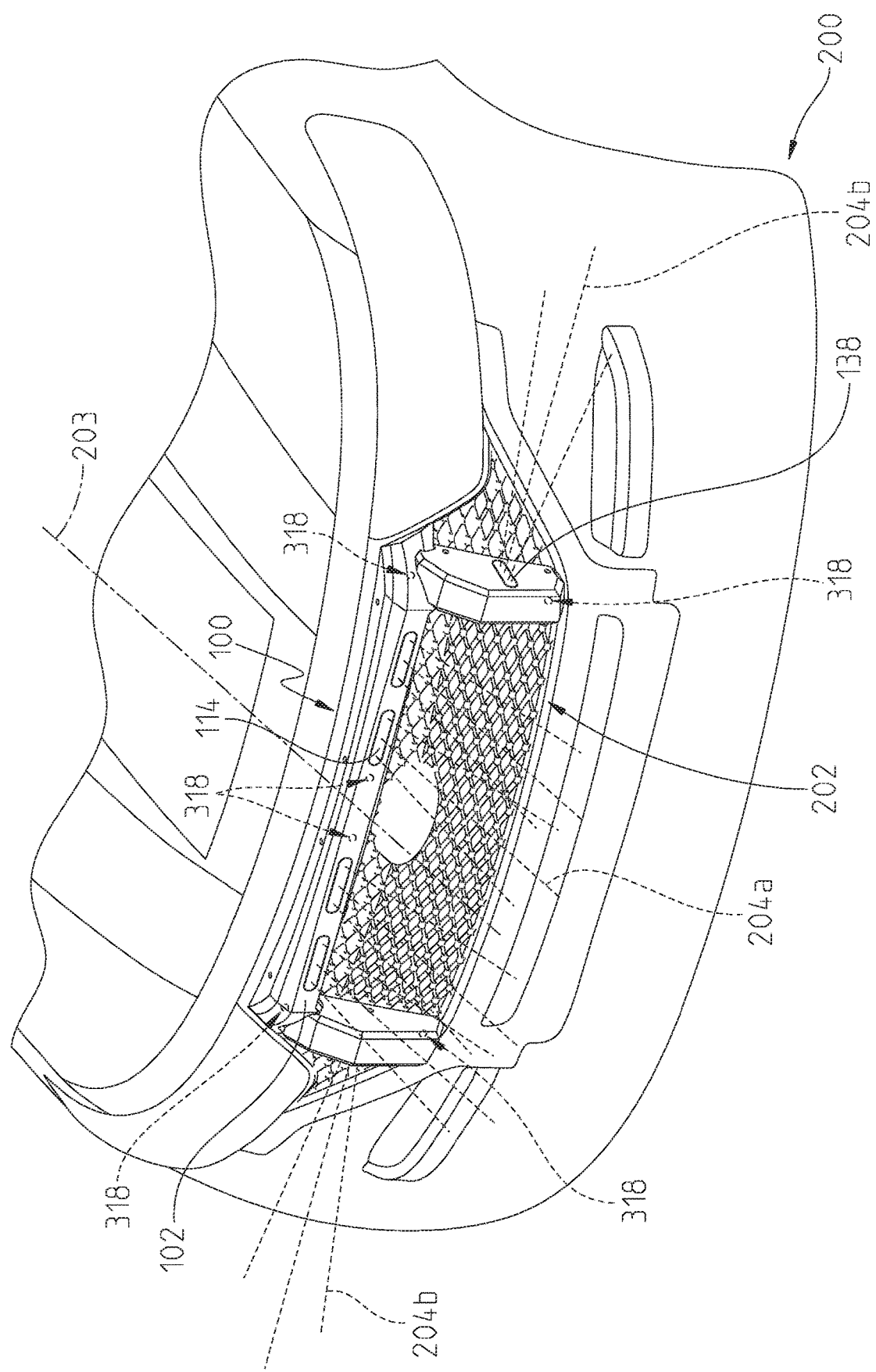
FIG. 1 is a perspective view of a lighting assembly of the present disclosure coupled to a fascia of a vehicle, the lighting assembly shown as emitting light.

Corresponding reference characters indicate corresponding parts throughout the several views. Although the drawings represent embodiments of various features and components according to the present disclosure, the drawings are not necessarily to scale and certain features may be exaggerated in order to better illustrate and explain the present disclosure. The exemplification set out herein illustrates an embodiment of the invention, and such an exemplification is not to be construed as limiting the scope of the invention in any manner.

DETAILED DESCRIPTION OF THE DRAWINGS

Referring initially to FIG. 1 a lighting assembly 100 for a vehicle 200 is illustrated. The lighting assembly 100 includes a frame 102 configured to support and display lighting units 114, 138. In an illustrative embodiment, the frame 102 is defined by a housing. The frame 102 of the lighting assembly 100 is coupled to a vehicle fascia 202, illustratively a front grille, of the vehicle 200 without requiring removal of the fascia 202 as described further herein. Placement of the lighting units 114, 138 provide visibility of the vehicle 200 from outside of the vehicle 200. For example, as shown, the lighting units 114, 138 each selectively emit light 204 as desired by the user. The illustrative lighting units 114, 138 may emit light 204 continuously (e.g., uninterrupted), according to a predetermined pattern, or may not emit light at all, as desired by the user. Furthermore, the lighting units 114, 138 may emit light of a single color, or multiple colors (e.g., blue and red). The lighting units 114, 138 are illustratively electrically coupled to a conventional light control unit (not shown) operably coupled to the vehicle 200, in a known manner.

Figure 2A:
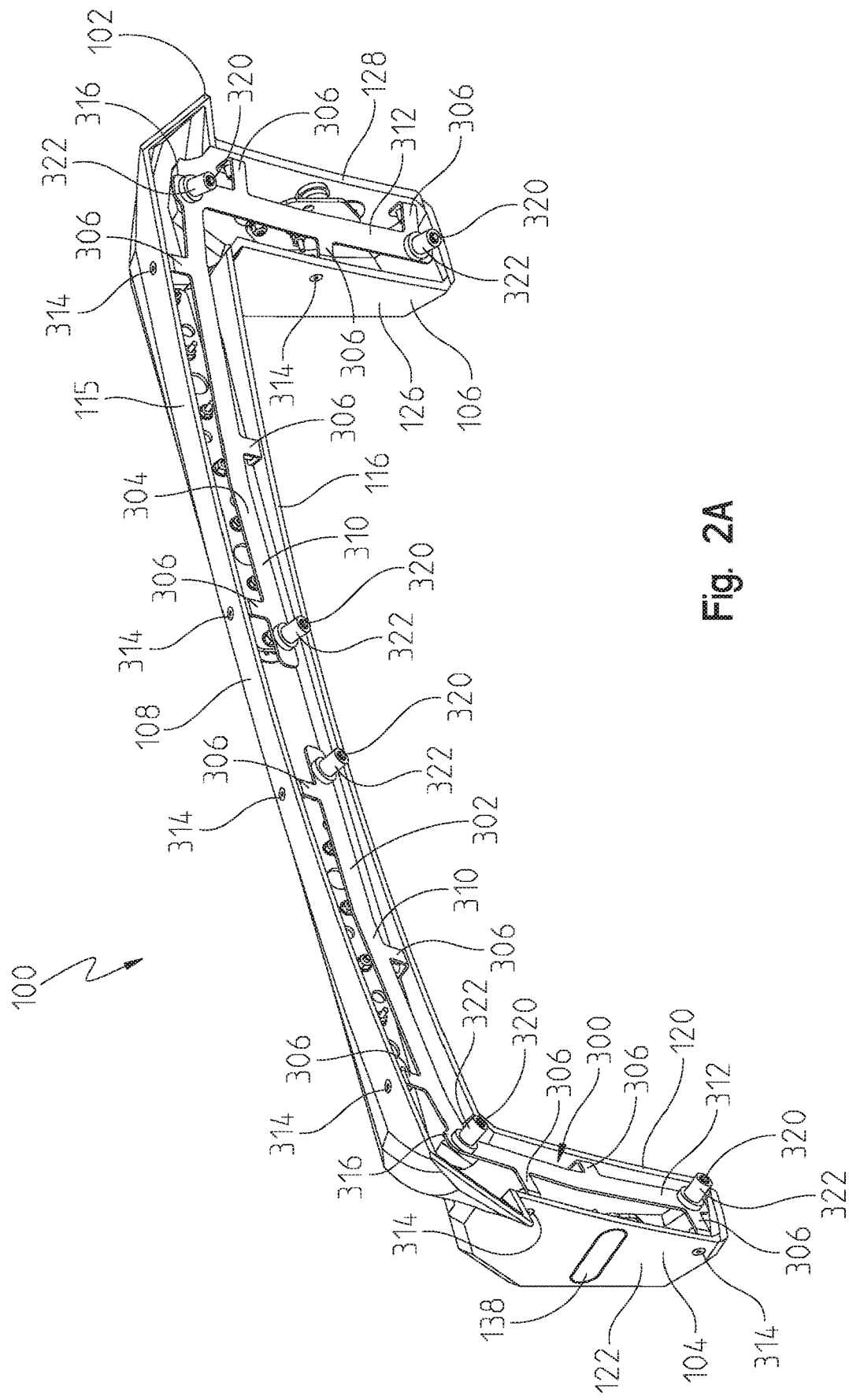
FIG. 2A is a rear perspective view of the lighting assembly of FIG. 1, the lighting assembly coupled to an installation assembly to facilitate coupling of the lighting assembly to the vehicle of FIG. 1, with the vehicle removed for clarity.
Figure 2B:
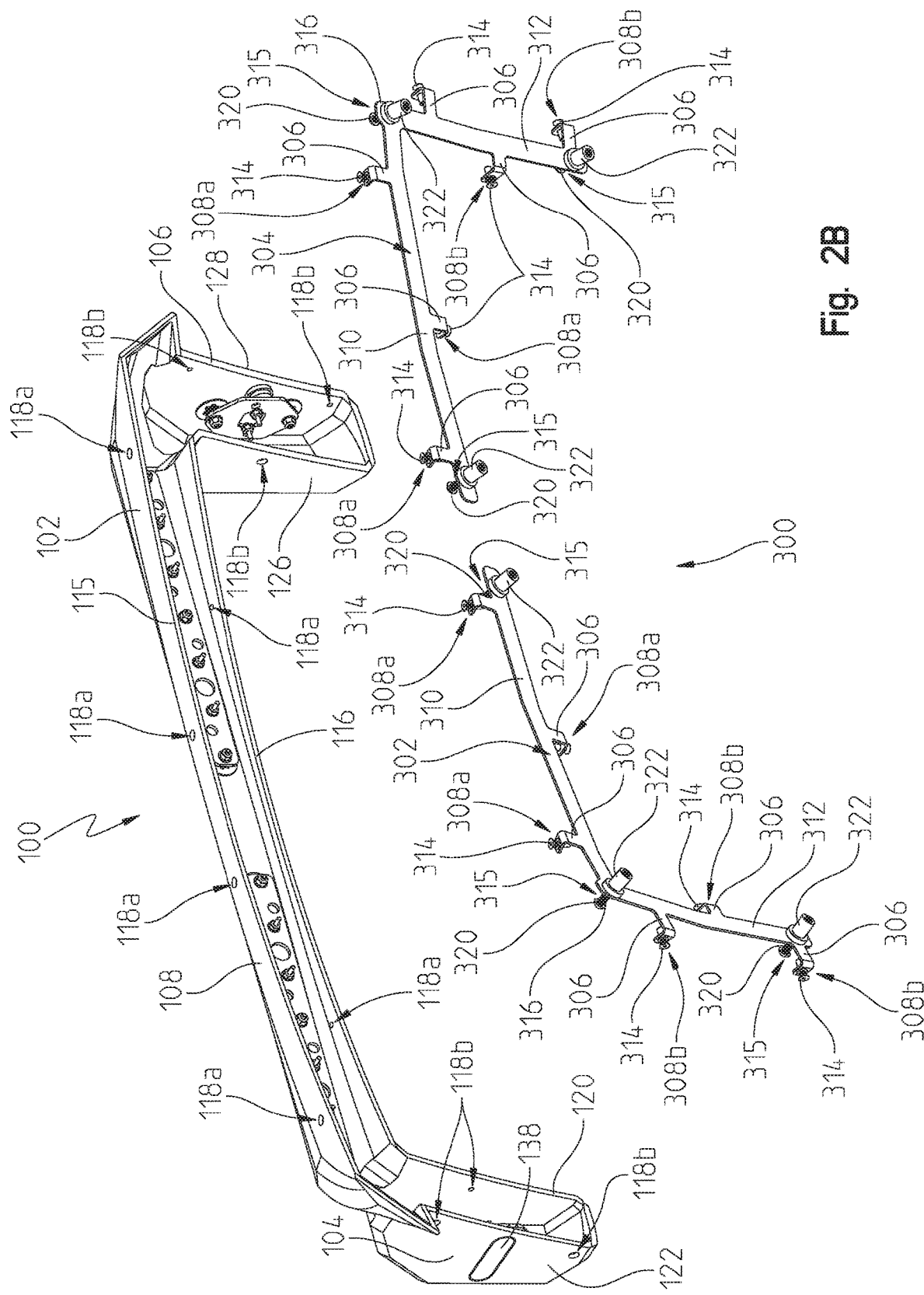
FIG. 2B is an exploded rear perspective view of the lighting assembly and installation assembly of FIG. 2A.

The lighting assembly 100 is coupled to the vehicle 200 with an installation assembly 300 illustrated in FIGS. 2A-2B. The installation assembly 300 includes a first or driver side bracket 302 and a second or passenger side bracket 304. Illustratively, the brackets 302, 304 are L-shaped, with a horizontal or latitudinal portion 310 corresponding with a cross-member or latitudinal portion 108 of the frame 102 and a vertical or longitudinal portion 312 corresponding with one of an upright or side profile portion 104, 106 of the frame 102. As illustrated, the first bracket 302 corresponds to the first side profile portion 104, and the second bracket 304 corresponds to the second side profile portion 106.

Each of the brackets 302, 304 includes a plurality of mounting flanges 306, each mounting flange 306 including a flange aperture 308 (FIG. 2B) corresponding with a fastener aperture 118 (FIG. 2B) of the frame 102 of the lighting assembly 100 discussed further herein. During installation, each bracket 302, 304 is aligned with the lighting assembly 100 so that the flange apertures 308 align with associated fastener apertures 118 of the frame 102.

In other words, the flange apertures 308a of the latitudinal portion 310 of each bracket 302, 304 align with the fastener apertures 118a within a top lip 115 and a bottom lip 116 of the latitudinal portion 108 of the frame 102, and the flange apertures 308b of the longitudinal portion 312 of each bracket 302, 304 align with the fastener apertures 118b of interior faces 120, 126 and exterior faces 122, 128 of the side profile portions 104, 106 of the frame 102, respectively. Once the brackets 302, 304 are properly aligned with the frame 102, a fastener 314 is disposed through both the fastener apertures 118 and the flange apertures 308 to secure the installation assembly 300 to the lighting assembly 100 as shown specifically in FIG. 2A. Illustratively, the fasteners 314 comprise screws or bolts, although other fastener types may be utilized. The fasteners 314 may be received within flange apertures 308, and/or may further include nuts to more securely couple the installation assembly 300 to the light assembly 100.

Referring again to FIG. 2B, the illustrative brackets 302, 304 further include a plurality of installation apertures 315. Illustratively, the brackets 302, 304 each includes at least three installation aperture 315, one positioned at a junction 316 of the latitudinal portion 310 and the longitudinal portion 312 of the bracket 302, 304, one positioned at a distal end of the latitudinal portion 310 opposite of the junction 316, and one positioned at a distal end of the longitudinal portion 312 opposite of the junction 316. In other embodiments, the installation apertures 315 may vary in number and be located at other positions along the brackets 302, 304.

Referring further to FIGS. 1-2B, the installation apertures 315 are configured to align with fascia apertures 318 of the fascia 202. The fascia apertures 318 may be prefabricated into the fascia 202 as illustrated in FIG. 1. In other illustrative embodiments, fascia apertures 318 may be drilled into the fascia 202 to correspond with the installation apertures 315 of the installation assembly 300. Various embodiments may require fascia apertures 318 to be drilled through at least one layer of a substrate (e.g., an air deflector) behind the fascia 202. During installation, the installation apertures 315 of the installation assembly 300 are aligned with the fascia apertures 318 of the fascia 202. Once aligned, a fastener 320 is disposed through each of the fascia apertures 318 and the corresponding installation apertures 315 to secure the installation assembly 300 to the vehicle 200.

In some illustrative embodiments, a nut 322, such as a well nut, may be disposed within the fascia apertures 318 and aligned with the installation apertures 315 before disposing the fastener 320 through the apertures 315, 318 to allow for blind fastening of the installation assembly 300 to the vehicle 200. In other illustrative embodiments, the nut 322 may be disposed on the fastener 320 before disposing the fastener through the corresponding installation aperture 315 and corresponding fascia aperture 318 to allow for blind fastening of the installation assembly 300 to the vehicle 200. In other words, the well nut 322 may be utilized to fasten the installation assembly 300 and corresponding lighting assembly 100 to the vehicle 200 without removing the fascia 202 from the vehicle 200.

Figure 3:
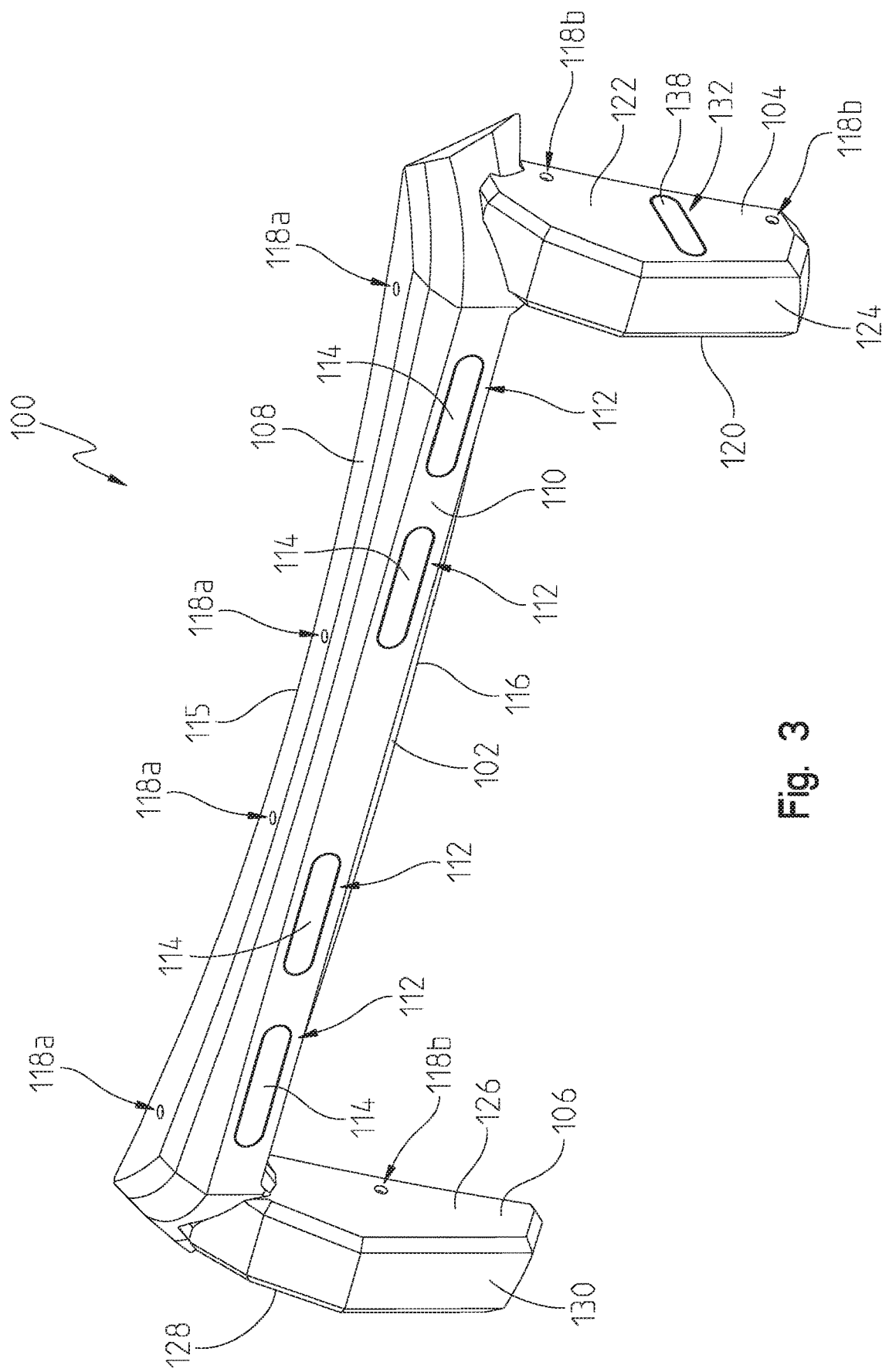
FIG. 3 is a front perspective view of the lighting assembly of FIG. 1.
Figure 5:
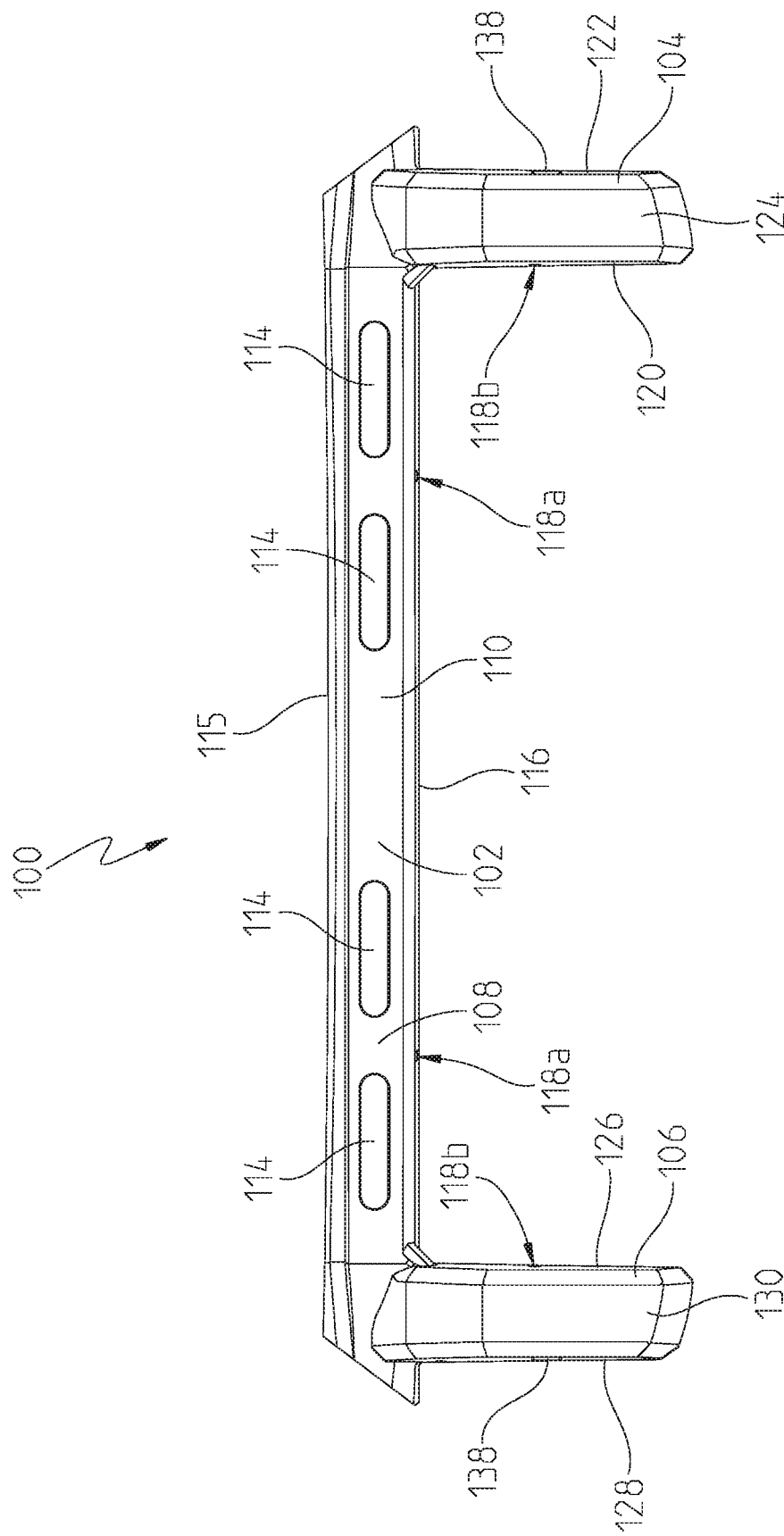
FIG. 5 is a front view of the lighting assembly of FIG. 3.

Now referring to FIG. 3, the lighting assembly 100 is further illustrated. The frame 102 of the lighting assembly 100 includes a first upright or side profile portion 104, a second upright or side profile portion 106, and a cross-member or latitudinal portion 108 substantially extending between the first side profile portion 104 and the second side profile portion 106. The latitudinal portion 108 includes a front-end face 110 defining a plurality of light supports, illustratively cut-outs 112, each light cut-out 112 configured to receive a lighting unit 114. As illustrated, the front-end face 110 defines four light cut-outs 112 having an elongated oval shape; however, in other embodiments, the front-end face 110 may define a fewer or greater number of light cut-outs of a variety of shapes. For example, the front-end face 110 may define a single light cut-out, two light cut-outs, three light cut-outs, four light cut-outs, five light cut-outs, six light cut-outs, or any other number of light cut-outs. Additionally, the light cut-outs may comprise any of a number of other shapes, including a circle, a rectangle, a standard oval, a hexagon, an octagon, or any other shape and size corresponding with the lighting unit 114.

The lighting units 114 may be of conventional design. In one illustrative embodiment, the lighting units 114 may be mPower series LED lights available from Soundoff Signal of Hudsonville, Mich. In another illustrative embodiment, the lighting units 114 may be T-Series LED lights available from Whelen Engineering Company, Inc. of Chester, Conn. As further detailed herein, the lighting units 114 are oriented forwardly to project light 204a in a forward direction generally parallel to a longitudinal axis 203 of the vehicle 200.

Referring to FIGS. 3-4, the latitudinal portion 108 further comprises the top lip 115 extending the length of the latitudinal portion 108 between the first side profile portion 104 and the second side profile portion 106, the top lip 115 extending rearwardly away from the front-end face 110 to facilitate the coupling of the light assembly 100 to the vehicle 200 (FIG. 1) discussed above. Similarly, the latitudinal portion 108 comprises the bottom lip 116 extending the length of the latitudinal portion 108 between the first side profile portion 104 and the second side profile portion 106, the bottom lip 116 extending rearwardly away from the front-end face 110 to facilitate the coupling of the light assembly 100 to the vehicle 200 (FIG. 1) discussed above. Each of the top lip 115 and the bottom lip 116 are illustratively contoured to conform to the associated vehicle fascia 202, and have a plurality of fastener apertures 118 for coupling the light assembly 100 to the vehicle 200 (FIG. 1) as discussed further herein.

Referring to FIGS. 3-6, the first side profile portion 104 includes a first interior face 120, a first exterior face 122, and a first arcuate longitudinal front face 124. Similarly, the second side profile portion 106 includes a second interior face 126, a second exterior face 128, and a second arcuate longitudinal face 130. As illustrated, the first arcuate longitudinal face 124 and the second arcuate longitudinal front face 130 are comprised of several straight-faced portions coupled together or otherwise formed as a single piece. In other embodiments, the first arcuate longitudinal face 124 and the second arcuate longitudinal face 130 may be formed as a single arcuate portion.

Illustratively, each one of the first side profile portion 104 and the second side profile portion 106 are coupled to a lower, outer-end portion of the latitudinal portion 108. Each of the side profile portions 104 and 106 may be coupled to the latitudinal portion 108 via adhesive, overmolding, or single-piece manufacturing. In other embodiments, the first side profile portion 104 and the second side profile portion 106 may be coupled to the latitudinal portion 108 at different portions of the latitudinal portion 108. For example, in other embodiments, the first side profile portion 104 and the second side profile portion 106 may be positioned closer to a center position of the latitudinal portion 108 so that ends of the latitudinal portion 108 substantially extend beyond the first side profile portion 104 and the second side profile portion 106. In other embodiments, the first side profile portion 104 and the second side profile portion 106 may be longitudinally centered on the latitudinal portion 108 or be coupled to an upper portion of the latitudinal portion 108.

Each one of the first exterior face 122 of the first side profile portion 104 and the second exterior face 128 of the second side profile portion 106 illustratively includes at least one light support, illustratively cut-outs 132 similar to the plurality of light cut-outs 112 on the front-end face 110 of the latitudinal portion 108. In the illustrated embodiment, each one of the first exterior face 122 and the second exterior face 128 have a single light cut-out 132 substantially the same shape and size as one of the plurality of light cut-outs 112. In other embodiments, the light cut-outs 132 may be alternate shapes or sizes relative to the light cut-outs 112 of the latitudinal portion 108. Each of the light cut-outs 132 may be shaped and sized to receive the lighting units 138 similar to the lighting units 114 received by the latitudinal portion 108 or may otherwise be shaped and sized to receive an alternate lighting unit. Additionally, the first exterior face 122, the second exterior face 128, the first interior face 120, and the second interior face 126 include a plurality of fastener apertures 118 configured to couple the lighting assembly 100 to the vehicle 200 (FIG. 1) as discussed above.

Figure 7:
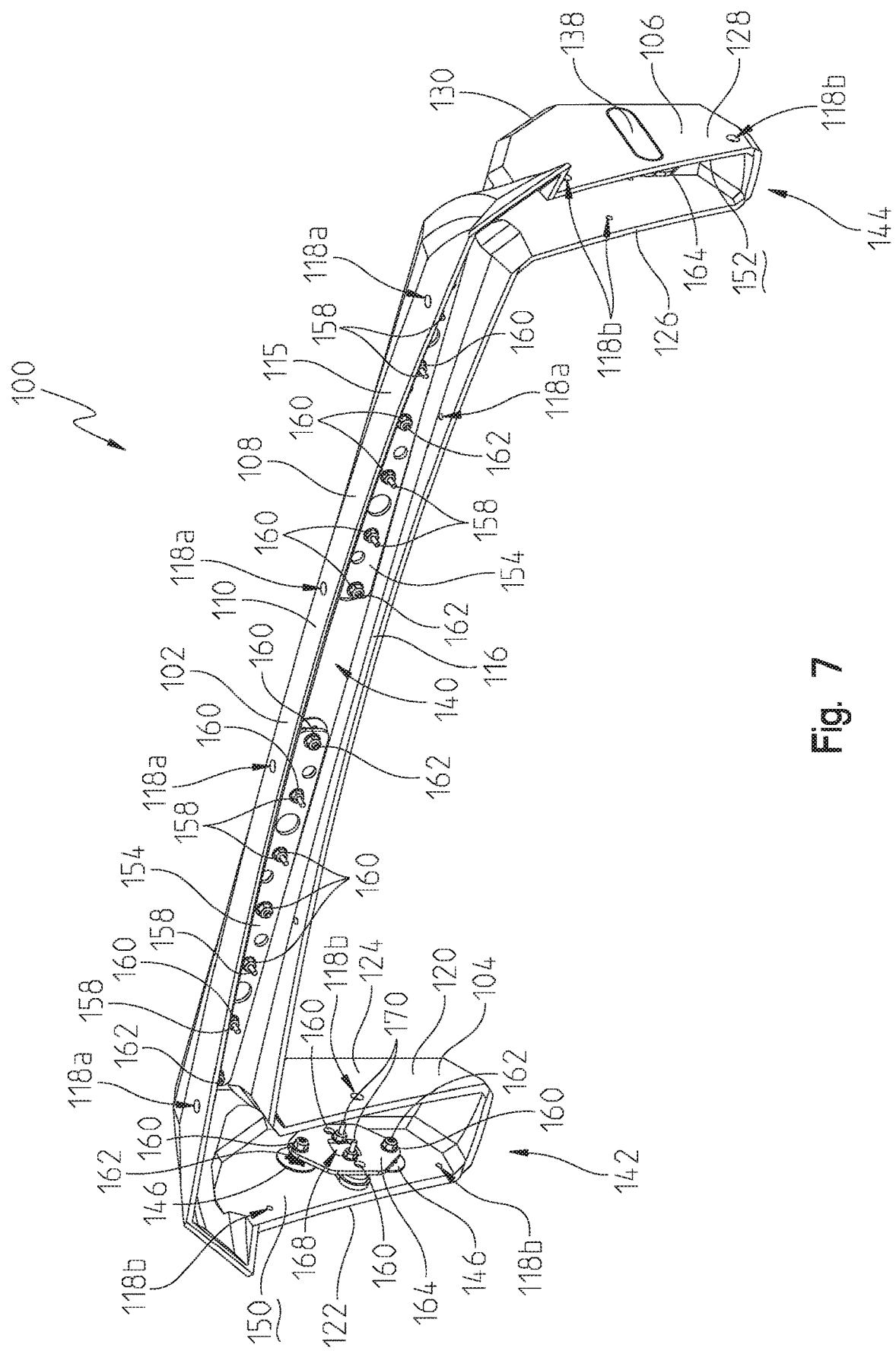
FIG. 7 is a rear perspective view of the lighting assembly of FIG. 3, the lighting assembly uncoupled from the installation assembly of FIGS. 2A, 2B.

Now referring to FIG. 7, the combination of the top lip 115, the bottom lip 116, and the front-end face 110 of the latitudinal portion 108 of the lighting assembly 100 forms a first partial chamber 140 to protect components of the lighting assembly 100 when coupled to the vehicle 200 (FIG. 1) as described further herein and further to hide the components from view for a more pleasing appearance. Furthermore, the combination of the first exterior face 122, the first interior face 120, and the first arcuate longitudinal face 124 forms a second partial chamber 142 to protect components of the lighting assembly 100 when coupled to the vehicle 200 (FIG. 1) as described further herein and further to hide the components from view for a more pleasing appearance.

The lighting units 138 may be of conventional design and similar to the lighting units 114. In one illustrative embodiment, the lighting units 138 may be mPower series LED lights available from Soundoff Signal of Hudsonville, Mich. In another illustrative embodiment, the lighting units 138 may be T-Series LED lights available from Whelen Engineering Company, Inc. of Chester, Conn. As further detailed herein, the lighting units 138 are oriented laterally outwardly to project light 204b in a sideways direction generally perpendicular to the longitudinal axis 203 of the vehicle 200.

Similarly, the combination of the second interior face 126, the second exterior face 128, and the second arcuate longitudinal face 130 forms a third partial chamber 144 to serve the same purpose as the first partial chamber 140 and the second partial chamber 142 described above. As illustrated, the first partial chamber 140, the second partial chamber 142, and the third partial chamber 144 are in communication to form a large, single partial chamber.

Figure 8:
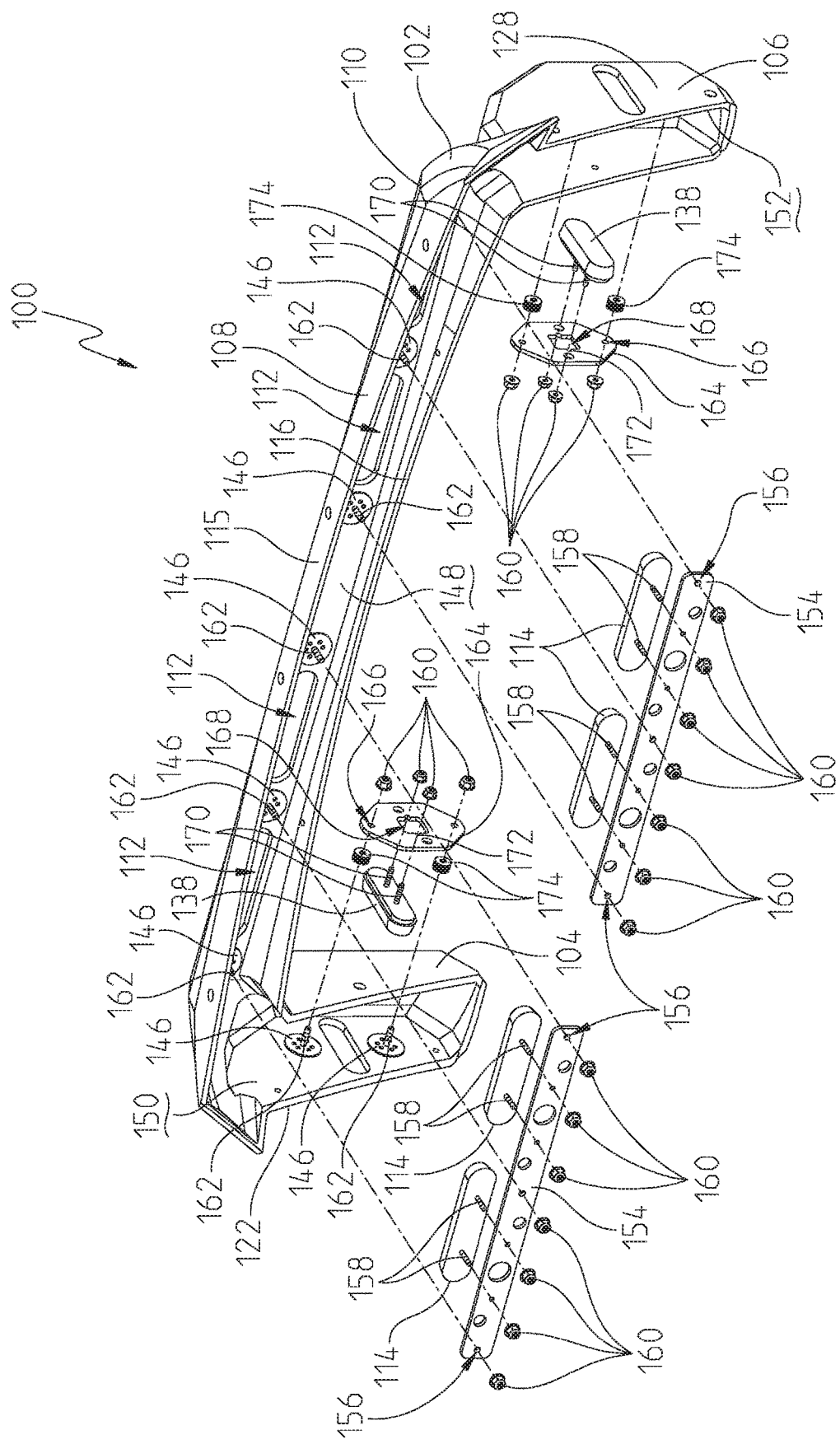
FIG. 8 is an exploded rear perspective view of the lighting assembly of FIG. 7.

Now referring to FIG. 8, additional details of the lighting assembly 100 are illustrated. A plurality of bolt stud fasteners 146 are coupled to the interior surface 148 of the front-end face 110 of the latitudinal portion 108. As shown, the fasteners 146 each include a stud 162, and are positioned on either side of the light cut-outs 112 to provide greater stability and proper alignment of the lighting units 114 with the light assembly 100 and, particularly, the light cut-outs 112 as further described herein. Further fasteners 146 are illustratively coupled to the interior surface 150 of the first exterior face 122 of the first side profile portion 104 and also to the interior surface 152 of the second exterior face 128 of the second side profile portion 106. The fasteners 146 may be coupled to the frame 102 via conventional fastening means, such as adhesive, overmolding, etc.

A pair of elongate light holders 154, each including a plurality of apertures 156, are configured to couple the lighting units 114 with the latitudinal portion 108 of the frame 102 via the fasteners 146. As illustrated, the lighting units 114 each include a pair of threaded prongs or studs 158, each of the prongs 158 sized and shaped to be received by one of the plurality of apertures 156. A locking flange nut 160 couples to each of the prongs 158 to secure the lighting unit 114 to the elongate light holder 154. Once the lighting units 114 are secured to the elongate light holder 154, the studs 162 of corresponding fasteners 146 are aligned with the remaining apertures 156 of the elongate light holders 154 and the studs 162 are then received by the remaining apertures 156. A locking flange nut 160 couples to each of the studs 162 to secure the elongate light holders 154 and the lighting unit 114 to the latitudinal portion 108 of the frame 102.

In other illustrative embodiments, the lighting units 114 may be devoid of prongs 158. In some embodiments, the lighting units 114 are inserted into the corresponding light cut-outs 112 and the corresponding elongate light holders 154 are positioned behind the lighting units so that studs 162 of the fasteners 146 are received by the corresponding apertures 156 of the elongate light holder 154. A locking flange nut 160 couples to each of the studs 162 to secure the elongate light holder 154 to the latitudinal portion 108 of the frame 102, thereby holding the lighting units 114 in place by exerting pressure onto the lighting unit 114.

Still referring to FIG. 8, a pair of profile light holders 164, each including a plurality of apertures 166 and defining a center opening 168, are each configured to couple a lighting unit 138 with the first side profile portion 104 and the second side profile portion 106, respectively, via the fasteners 146. Similar to the lighting units 114, the lighting units 138 each include a pair of prongs 170 to be received by a cut-out portion 172 of the center opening 168. A locking flange nut 160 couples to each of the prongs 170 to secure the lighting unit 138 to the respective profile light holder 164. Once each lighting unit 138 is secured to the respective lighting unit 138, the studs 162 of corresponding fasteners 146 are aligned with apertures 156 of the respective profile light holder 164 and the studs 162 are then received by said apertures 156. A locking flange nut 160 couples to each of the studs 162 to secure the profile light holders 164 and the lighting unit 138 to either the first side profile portion 104 or the second side profile portion 106 of the frame 102. In some embodiments, a plurality of washers 174 are positioned between the fasteners 146 and the respective elongate light holder 154 or the respective profile light holder 164 to facilitate coupling of the respective light holder 154, 164 to the frame with mitigation or prevention of damage to the fastener 146 and light holder 154, 164. In other embodiments, no washers are used.

In other illustrative embodiments, the lighting units 138 may be devoid of prongs 170. In some embodiments, the lighting units 138 are positioned into the corresponding light cut-outs 132 and the corresponding profile light holders 164 are positioned behind the lighting units 138 so that the studs 162 of the corresponding fasteners 146 are received by the corresponding apertures 156 of the profile light holder 164. A locking flange nut 160 couples to each of the studs 162 to secure the profile light holder 164 to the respective first side profile portion 104 or the second side profile portion 106 of the frame 102, thereby holding the lighting units 138 in place by exerting pressure onto the lighting unit 138.

The method and apparatus described herein offer and quick and efficient assembly of exterior lighting to an existing vehicle grille. Such method and apparatus reduces required labor and improves cost efficiency by allowing coupling of the lighting apparatus to the vehicle without removing or replacing the existing vehicle grille. More vehicles in a fleet may be outfitted in shorter time period. Furthermore, the apparatus improves safety by providing visible front and side profile lighting to a front end of the vehicle, which allows any oncoming transverse or forward traffic to more easily see the vehicle and its operator.

While the invention has been described by reference to various specific embodiments it should be understood that numerous changes may be made within the spirit and scope of the inventive concepts described, accordingly, it is intended that the invention not be limited to the described embodiments but will have full scope defined by the language of the following claims.

What is claimed is:

1. A lighting and installation assembly for coupling to a front fascia of a vehicle, the assembly comprising:
   a frame defining a first light cut-out and a plurality of frame apertures;
   a plurality of frame fasteners coupled to an interior face of the frame, each of the frame fasteners including a stud;
   a lighting unit corresponding to each light cut-out;
   a main light holder defining a plurality of holder apertures, the holder apertures each configured to selectively receive the stud of one of the plurality of frame fasteners; and
   a first bracket comprising a plurality of flanges defining a plurality of flange apertures, the plurality of flange apertures corresponding with the plurality of frame apertures, and defining a plurality of bracket apertures, each of the bracket apertures configured to receive an installation fastener.

2. The lighting and installation assembly of claim 1, wherein the installation fastener comprises a well nut.

3. The lighting and installation assembly of claim 1, wherein the frame comprises a latitudinal portion defining a plurality of the first light cut-outs, a first side profile portion defining a first side light cut-out, and a second side profile portion defining a second side light cut-out.

4. The lighting and installation assembly of claim 3, further comprising a first side light holder corresponding with the first side profile portion and a second side light holder corresponding with the second side profile portion, wherein the main light holder corresponds with the latitudinal portion.

5. The lighting and installation assembly of claim 3, further comprising a second bracket, each of the first bracket and the second bracket comprising an L-shape, with a first portion corresponding with the latitudinal portion of the frame and a second portion corresponding with one of the first side profile portion and the second side profile portion.

6. The lighting and installation assembly of claim 3, wherein the first light cut-out, the first side light cut-out, and the second side light cut-out are substantially the same shape.

7. The lighting and installation assembly of claim 1, wherein a fastener is disposed through the frame aperture and the flange aperture to secure the bracket to the frame.

8. The lighting and installation assembly of claim 1, wherein each one of the studs is configured to receive a nut after the stud is received by one of the holder apertures to secure the light holder to the frame, respectively.

9. The lighting and installation assembly of claim 1, wherein the lighting and installation assembly is configured to couple to a front grille of a vehicle.

10. The lighting and installation assembly of claim 9, wherein the front grille includes fascia apertures, each of the fascia apertures configured to receive the installation fastener.

11. The lighting and installation assembly of claim 1, wherein each lighting unit includes at least one prong, the holder apertures of the main light holder configured to selectively receive the at least one prong of the lighting unit.

12. The lighting and installation assembly of claim 11, wherein each one of the prongs is configured to receive a locking flange nut after the prong is received by one of the holder apertures to secure the lighting unit to the light holder.

13. A lighting assembly comprising:
a frame coupled to a front grille of a vehicle, the frame comprising a latitudinal portion defining at least one front light support, a first side profile portion defining a first side light support, and a second side profile portion defining a second side light support, the frame further defining a plurality of frame apertures;
a plurality of front lighting units, each of the front lighting units corresponding to one of the plurality of front light supports, the front lighting unit configured to emit light in a direction forward-facing from the vehicle; and
a first side lighting unit corresponding to the first side light support; and
a second side lighting unit corresponding to the second side light support, the first side lighting unit and the second side lighting unit each configured to emit light in a direction away from a corresponding side of the vehicle and substantially perpendicular to the plurality of front lighting units.

14. The lighting assembly of claim 13, further comprising a plurality of frame fasteners coupled to an interior face of the frame, each of the frame fasteners including a stud.

15. The lighting assembly of claim 14, further comprising a main light holder defining a plurality of holder apertures, the holder apertures each configured to selectively receive the stud of one of the plurality of frame fasteners.

16. The lighting assembly of claim 15, further comprising a first side light holder corresponding with the first side profile portion and a second side light holder corresponding with the second side profile portion, wherein the main light holder corresponds with the latitudinal portion.

17. The lighting assembly of claim 15, wherein each one of the studs is configured to receive a locking flange nut after the stud is received by one of the holder apertures to secure the light holder to the frame, respectively.

18. The lighting assembly of claim 15, wherein each lighting unit includes at least one prong, the holder apertures of the main light holder configured to selectively receive the at least one prong of the lighting unit.

19. The lighting assembly of claim 18, wherein each one of the prongs is configured to receive a locking flange nut after the prong is received by one of the holder apertures to secure the lighting unit to the light holder.

20. The lighting assembly of claim 13, wherein the light supports are cut-outs of substantially the same shape.

21. The lighting assembly of claim 13, further comprising a first bracket comprising a plurality of flanges defining a plurality of flange apertures, the plurality of flange apertures corresponding with the plurality of frame apertures, and defining a plurality of bracket apertures, each of the bracket apertures configured to receive an installation fastener.

22. The lighting assembly of claim 21, further comprising a second bracket, each of the first bracket and the second bracket comprising an L-shape, with a first portion corresponding with the latitudinal portion of the frame and a second portion corresponding with one of the first side profile portion and the second side profile portion.

23. The lighting assembly of claim 22, wherein fasteners are disposed through the frame apertures and the flange apertures to secure the brackets to the frame.

24. The lighting assembly of claim 21, wherein the front grille includes at least one fascia aperture, the fascia aperture configured to receive the installation fastener.

25. The lighting assembly of claim 24, wherein the installation fastener comprises a well nut.

26. A method for installing a lighting assembly, the method comprising:
coupling a lighting unit to a light holder;
coupling the light holder to a frame of the lighting assembly;
providing a bracket defining a plurality of installation apertures;
aligning the plurality of installation apertures with a plurality of fascia apertures in a fascia of a vehicle;
disposing a fastener through the plurality of installation apertures and the corresponding fascia apertures; and
coupling the bracket to the frame of the lighting assembly.

27. The method of claim 26, wherein the fascia comprises a front grille, and the front grille is not removed from the vehicle.

28. The method of claim 26, further comprising positioning a well nut within the fascia opening, and wherein the disposing step includes threading the fastener into the well nut.

29. The method of claim 26, wherein the lighting unit includes a pair of prongs, each of the prongs configured to be received by a holder aperture of the light holder.

30. The method of claim 26, wherein the lighting assembly comprises a plurality of fasteners coupled to an interior surface of the frame, each fastener comprising a stud configured to be received by a holder aperture of the light holder.

31. The method of claim 26, wherein the bracket further comprises a plurality of flanges, each of the flanges including a flange aperture configured to align with a plurality of frame apertures defined by the frame.

32. The method of claim 31, further comprising aligning the flange aperture with the corresponding frame aperture and disposing a fastener through both the flange aperture and the frame aperture to secure the bracket to the frame.

33. A method of installing a lighting assembly, the method comprising:
positioning a lighting unit within a light cut-out defined by a frame of the lighting assembly;
receiving a stud of a fastener through a corresponding holder aperture of a plurality of holder apertures defined by a light holder, the fastener coupled to an interior surface of the frame;
disposing a nut on the stud to secure the light holder to the frame;
aligning a flange aperture defined by a flange of a bracket with a frame aperture defined by the frame;
disposing a fastener through both the flange aperture and the frame aperture to secure the bracket to the frame;
aligning an installation aperture defined by the bracket with a fascia aperture of a fascia of a vehicle;
positioning a well nut within the fascia aperture; and
inserting a fastener within the installation aperture and the well nut to secure the bracket to the fascia.

34. The method of claim 33, wherein the frame defines a plurality of light cut-outs, the method further comprising coupling a plurality of lighting units with a plurality of light holders and securing the plurality of light holders to the frame so that each light cut-out aligns with a lighting unit.

35. The method of claim 33, the method further comprising disposing a set of prongs of the lighting unit through a corresponding set of the plurality of holder apertures defined by the light holder.

36. The method of claim 35, the method further comprising disposing a nut on each of the prongs to secure the lighting unit to the light holder.

* * * * *